US006853906B1

(12) United States Patent
Michi et al.

(10) Patent No.: US 6,853,906 B1
(45) Date of Patent: Feb. 8, 2005

(54) METHOD AND DEVICE FOR DETERMINING A FUTURE TRAVEL-PATH AREA OF A VEHICLE

(75) Inventors: Harald Michi, Oelbronn-Duerren (DE); Michael Scherl, Asperg (DE); Bernd Lichtenberg, Vaihingen/Enz (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,113
(22) PCT Filed: Oct. 6, 1999
(86) PCT No.: PCT/DE99/03219
§ 371 (c)(1),
(2), (4) Date: May 31, 2001
(87) PCT Pub. No.: WO00/33151
PCT Pub. Date: Jun. 8, 2000

(30) Foreign Application Priority Data

Dec. 1, 1998 (DE) .......................................... 198 55 400

(51) Int. Cl.[7] .............................................. G01C 21/26
(52) U.S. Cl. ..................................................... 701/207
(58) Field of Search .......................... 701/207, 93, 96, 701/300, 301; 180/168, 169; 340/435, 436, 438, 481

(56) References Cited

U.S. PATENT DOCUMENTS

| 4,786,164 A | | 11/1988 | Kawata | |
|---|---|---|---|---|
| 5,197,562 A | | 3/1993 | Kakinami et al. | |
| 5,349,520 A | | 9/1994 | Hickman | |
| 5,467,283 A | * | 11/1995 | Butsuen et al. | 180/169 |
| 5,467,284 A | * | 11/1995 | Yoshioka et al. | 180/169 |
| 5,510,990 A | * | 4/1996 | Hibino et al. | 180/169 |
| 5,648,905 A | * | 7/1997 | Izumi et al. | 701/301 |
| 5,745,870 A | * | 4/1998 | Yamamoto et al. | 340/435 |
| 5,754,099 A | * | 5/1998 | Nishimura et al. | 340/435 |
| 5,786,787 A | * | 7/1998 | Eriksson et al. | 342/70 |
| 5,841,366 A | * | 11/1998 | Yamamoto et al. | 340/901 |
| 6,067,031 A | * | 5/2000 | Janky et al. | 180/169 |
| 2002/0017415 A1 | * | 2/2002 | Campbell et al. | 180/271 |

FOREIGN PATENT DOCUMENTS

| DE | 41 33 882 | 4/1992 | |
|---|---|---|---|
| DE | 43 41 689 | 6/1994 | |
| DE | 196 14 061 | 10/1996 | |
| DE | 197 22 947 | 2/1999 | |
| EP | 657857 A1 * | 6/1995 | G08G/1/16 |
| JP | 07220199 A * | 8/1995 | G08G/1/16 |

OTHER PUBLICATIONS

Foley et al "Computer Graphics: Principles and Practice" Addison–Wesley Publishing Company, second edition. p. 252–271; 1063.*
*Patent Abstracts of Japan, vol. 1997, No. 12, Dec. 25, 1997 & JP 09 207609 A (Fujitsu Ten Ltd) Aug. 12, 1997.
Winner et al., "Adaptive Cruise Control—System and Aspects and Development Trends", SAE Technical Papers, Series No. 961010, Feb. 26–29, 1996.

* cited by examiner

*Primary Examiner*—Thu V. Nguyen
(74) *Attorney, Agent, or Firm*—Kenyon & Kenyon

(57) ABSTRACT

A method and a device are described for determining a future travel-path area of a first vehicle, which is furnished with a distance sensor. In this context, using the distance sensor at pre-established or selectable time points, at least relative positions are determined of at least one vehicle traveling ahead with respect to the first vehicle. At least these determined relative positions are stored in at least one storage device. These relative positions, stored in the storage device, constitute in each case a course path of the corresponding vehicle traveling ahead. The future travel path area of the first vehicle is determined at least on the basis of the course path of the vehicle traveling ahead. The course path of the vehicle traveling ahead is projected in the direction of the position of the first vehicle.

16 Claims, 6 Drawing Sheets

METHOD AND DEVICE FOR DETERMINING A FUTURE TRAVEL-PATH AREA OF A VEHICLE

FIELD OF THE INVENTION

The present invention relates to a method and a device for determining a future travel-path area of a motor vehicle. It can be applied, for example, in an adaptive speed or distance control of a vehicle, in an adaptive headlight leveling adjustment, or simply in detecting critical situations. The vehicle is furnished with at least one sensor, which can detect, or at least determine the position of, vehicles traveling ahead and stationary objects in the forward field of the vehicle. Sensors of this type can be configured, for example, as radar, laser, or video sensors. The present invention can be used in connection with an adaptive speed or distance control system of a vehicle.

BACKGROUND INFORMATION

In past years, numerous publications have appeared, which deal with an automatic control system for the speed of a motor vehicle while taking into consideration the distance with respect to vehicles traveling ahead. Systems of this type are frequently termed Adaptive Cruise Control (ACC) or, adaptive or dynamic speed regulators. One fundamental problem in systems of this type, in view of contemporary traffic patterns, is an automatic decision as to which vehicle of a plurality of vehicles traveling ahead is relevant, or most relevant, for the speed or distance control system. This decision is particularly challenging when the road on which the controlled vehicle is moving is multi-lane and curvy. In this case, a distance sensor, which is used, inter alia, for detecting vehicles traveling ahead, usually also detects vehicles that are located on neighboring lanes and that therefore have only minor relevance for a distance control system.

Therefore, in an ACC system, there exists a need to determine a future course path, or a future travel-path area, of the controlled vehicle, in order, once this area is known, to determine the most relevant vehicles traveling ahead or, conversely, to determine the obstacle that at an instantaneous time point is the most dangerous. Both variables, as well as the course path and the travel-path area, are fundamentally oriented on the direction of the road, but in the optimal case they also take into account, if appropriate, any lane changing or turning behavior carried out by the controlled vehicle. In this context, the concept "future travel-path area" is distinguished in what follows from the concept "future travel-path" in that the former contains the entire spatial area in which the controlled vehicle will probably move. This means that it also takes into account in each case the width required by the motor vehicle.

Conventional solutions to the aforementioned problem are described, for example, in the publication "Adaptive Cruise Control—System Aspects and Development Trends" by winner, Witte, et al., published as SAE Technical Papers Series No. 961010 at the SAE of Feb. 26–29, 1996. In that publication, the simplest way to predict a future course of a controlled vehicle is to assume movement in a straight line. However, this type of prediction does not function in the case of curves or lane changes. A more complex case, which nevertheless delivers sufficient results for wide areas, is to assume a course having a constant curvature. The latter is determined, for example, on the basis of a difference of wheel speeds, a steering or steering wheel angle, transverse accelerations, and/or yaw rates. Corresponding methods can be found in the field of driving dynamic control systems. In this method, the future course path or travel-path area is only estimated in each case on the basis of the present course. Therefore, here too, errors arise in response to every change of course, for example, in driving into or out of curves. A further possibility for predicting a course path, which is also mentioned in the cited publications, is the application of navigation systems. However, the limits of this method depend on how up-to-date and precise the available maps are and on the capacity of the system to determine in each case the current position of the vehicle. The prediction may be unreliable in construction zones or on new roads. As a further possibility, in the above-cited publication, a prediction of the road course or the lane based on radar data is mentioned. Stationary objects are used such as reflectors or crash barriers, which are detected by a signal processor, in order to reconstruct the road borders. However, according to the publication, little is known regarding the quality and reliability of this method.

In U.S. Pat. No. 4,786,164, a system and a method are described for detecting the distance between two vehicles which are moving in the same traffic lane. In this context, the lane in which each of the two vehicles is moving is determined on the basis of a comparison of angles at which reflectors that are placed on both sides of the road are detected. However, the method described here can only be used if suitable reflectors are actually present on both sides of the road, and is therefore dependent on infrastructure conditions.

In German Patent Application No. 196 14 061 A1, a system is described for controlling the distance to a vehicle traveling ahead on the basis of an adjustable probability distribution. This system has a curvature determination device, in which the curvature of a road is determined on the basis of a steering angle and a vehicle speed. To improve the reliability, according to a first modification, the steering angle is determined on the basis of the motion of a specified stationary object. For this purpose, the locations of a stationary object relative to a system vehicle in motion are monitored at uniform time intervals. The locations are then defined as a circular arc to calculate the curvature of the road on which the system vehicle is traveling. According to a second modification, a sharp curve of the road can also be detected on the basis of a stationary object. According to a fourth modification, the calculated curvature can be increased or reduced if a turning signal indicates the right or left direction. According to a tenth modification, it is possible, on the basis of a navigation system, for example, a GPS system, to determine whether a curve is present in a forward direction of the system vehicle.

German Patent No. 41 33 882 describes a method for independently following a vehicle in the lane of a specific vehicle traveling ahead. For this purpose, using an electronic camera, the significant rear area of a leading vehicle is monitored and the sideways misalignment with respect to it is approximately determined. The goal appears to be to obtain control signals for steering the vehicle carrying the camera.

German Patent No. 43 41 689 describes a system for detecting a vehicle traveling ahead. The point of departure is a center line, which represents the extension of the vehicle axis. Around this line, areas of varying probabilities are defined, which are used to recognize a detected target as being located in the lane or as being irrelevant. The curvature of the road ahead is calculated on the basis of the current steering angle and of the current speed. A displacement is determined as a function of this predicted curvature, at the distance at which another vehicle has been detected, and the previously determined probability distribution is shifted by this value.

German Patent Application No. 197 22 947 describes a method and a device for determining a future travel-path area of a vehicle. There, on the basis of the detected positions of the vehicles traveling ahead, the course paths of the latter are observed and in each case the transverse offset is determined with respect to the first vehicle's own position. This occurs in each case at the point in time at which the first vehicle has passed the point at which a first position of the corresponding vehicle traveling ahead had been stored in memory. Based on the knowledge of this transverse offset and of the stored course paths of the vehicles traveling ahead, a future travel-path area of the first vehicle can be determined.

These methods and devices appear to describe approaches to determining the future travel-path area of a first vehicle using the earliest possible time point for determining a travel-path area as the time point at which a point is passed at which a position of a vehicle traveling ahead has been detected.

SUMMARY OF THE INVENTION

The present invention provides a method and a device for reliably determining a future travel-path area of a first vehicle. According to the present invention, this travel-path area is able to be determined reliably and in a timely fashion, especially when vehicles traveling ahead have been detected for the first time.

According to the present invention, the future travel-path area of the first vehicle is determined at least on the basis of a course path of a vehicle traveling ahead that is projected onto the position of the first vehicle. This means that the detected course path of the vehicle traveling ahead is projected into an area in front of the first vehicle, in which no measured positions of the vehicle traveling ahead are present.

According to the present invention, the future travel-path area of the first vehicle before a position is reached at which a vehicle traveling ahead has been is detected can be determined.

According to an embodiment of the present invention, in accordance with the speed of the first vehicle and the range of the distance sensor, it is possible to gain up to two seconds in comparison with previous methods and devices, in which it is already possible to determine the future travel-path area of the first vehicle. This can contribute to reducing the pressure on the driver of the first vehicle and to increasing general driving safety.

The course path of the vehicle traveling ahead can be projected up until the position at which the first vehicle is located. This allows the system the maximum exploitation of the stored data for determining the future travel-path area of the first vehicle.

According to an embodiment of the present invention, a transverse offset and/or a curvature is determined between the projected course path of the vehicle traveling ahead and the current course path of the first vehicle. Using the transverse offset and/or the curvature of the course path of the first vehicle with respect to the projected course path of the vehicle traveling ahead, a future travel-path area of the first vehicle is determined. This embodiment offers the advantage that, for determining the future travel-path area of the first vehicle, it is also possible to use a projected course path of a vehicle traveling ahead which is not moving in the same traffic lane as the first vehicle.

In a further embodiment of the present invention, the future travel-path area is determined on the basis of the projected course paths of a plurality of vehicles traveling ahead. In this context, a lane change of a single vehicle traveling ahead is filtered out using comparison, correlation, or an average of the projected course paths of all vehicles traveling ahead. This refinement, especially given the presence of many other traffic participants, leads to improved reliability of the method and device according to the present invention. Therefore, all projected course paths of vehicles traveling ahead can be used for determining the travel-path area of the first vehicle, which results in improving the reliability of the determined travel-path area.

Further embodiments of the present invention provide at selected and/or freely selectable time points a comparison of the stored course paths of the vehicles traveling ahead with the current coordinate system of the first vehicle. The storage device can be exploited for recording the projected course paths of vehicles traveling ahead because a detected position of a vehicle traveling ahead, calculated with respect to the current coordinate system of the first vehicle, therefore represents a position relative to the first vehicle. The data to be stored can be composed of, for example, only one distance and angle specification.

The course path of the vehicle traveling ahead can be projected using statistical analyses and/or mathematical interpolation methods on the stored relative positional data. This analytic, approach, and this interpolation method, make possible a very precise determination of the course path to be projected.

Further embodiments of the present invention evaluate the projected course paths of the vehicles traveling ahead using at least one performance index which contains both statistical as well as non-predictable and predictable components. Therefore, it is possible to delete from the storage device a projected course path of a vehicle traveling ahead having a performance index that lies beneath a predetermined threshold value, and/or not to consider it for determining the future travel-path area of the first vehicle. In this manner, exploitation of the storage device is improved because data which are less well-suited for determining the future travel-path area of the first vehicle are deleted from the storage device. It is possible not to use less suitable data in determining the travel-path area, which leads to a more precise determination.

According to a further embodiment of the present invention, the storage device is organized as a ring storage device. The memory management is simplified, and determining the future course path of the first vehicle is accelerated. Especially in this type of storage organization, no shifting of data within the storage device is necessary. That is, the oldest stored data value for a course path of a vehicle traveling ahead is replaced by the currently detected value, and only a corresponding reference to the storage location is changed.

According to a further embodiment of the present invention, when the storage device is full, for storing at least one new course path of a further vehicle traveling ahead, in accordance with a further performance index which rests only on predictable components, the decision is made as to whether at least one of the previously stored course paths and/or the at least one new course path should be deleted. That is, when the storage device is full, it is determined using a performance index whether a previously stored course path should be deleted or whether the newly detected data have a worse index than all of the course paths stored in the storage device and that therefore the newly stored data should be discarded.

According to a further embodiment of the present invention, the future travel-path area is limited on the basis of the positions of detected, stationary objects or on the basis of positions of detected, oncoming vehicles. This allows for sensibly limiting the determination of the future travel-path area of the first vehicle which significantly increases the precision of the determined travel-path area. Furthermore, in this manner, further independent data can contribute to determining the future travel-path area.

According to a further embodiment of the present invention, in addition to the first future travel-path area, determined in accordance with present invention, at least one further future travel-path area is determined on the basis of a steering angle, a steering wheel angle, a yaw rate, a difference of wheel speeds, or a transverse acceleration of the controlled vehicle, or on the basis of stationary objects or of oncoming vehicles which are detected by the distance sensor of the first vehicle. On the basis of the first and the at least one further determined future travel-path area, a verified future travel-path area can then be determined. A future travel-path area of the controlled vehicle can be determined on the basis of different methods that are independent of each other. By combining these individually determined future travel-path areas, errors individually arising in the methods/devices can be corrected, so that the verified future travel-path area contains an optimal prediction of the actual travel-path area.

Certain embodiments of the present invention provide that the future travel-path area is determined on the basis of measuring data which actually lie in the forward field of the controlled vehicle, and that these data are projected in the direction of the first vehicle's own position. In place of an estimation based on extrapolating an instantaneous situation, the situation actually existing in the forward field of the vehicle is evaluated. In this manner, it is especially possible to detect in a timely fashion the beginning or end of a curve. As a result, the error rate is significantly reduced compared with previously known methods. Further, the present invention is independent of particular infrastructure conditions, such as specially provided reflectors on the road edge. However, if appropriate reflectors are present, they can be taken into account accordingly. Furthermore, the present invention can be realized without special expense in a vehicle which is equipped with an adaptive speed regulating system, in particular without requiring an additional image pick-up and image valuation unit.

The movement of one or a plurality of vehicles traveling ahead is observed for determining the future course path or travel-path area of the first vehicle. In this context, as long as a detected position of a vehicle traveling ahead is not reached by the first vehicle, the detected course path of the vehicle traveling ahead is projected in the direction of the first vehicle's own position. Therefore, determining the travel-path area for the first vehicle is possible even before a position has been reached at which a vehicle traveling ahead has been detected.

DETAILED DESCRIPTION

Figure 1:
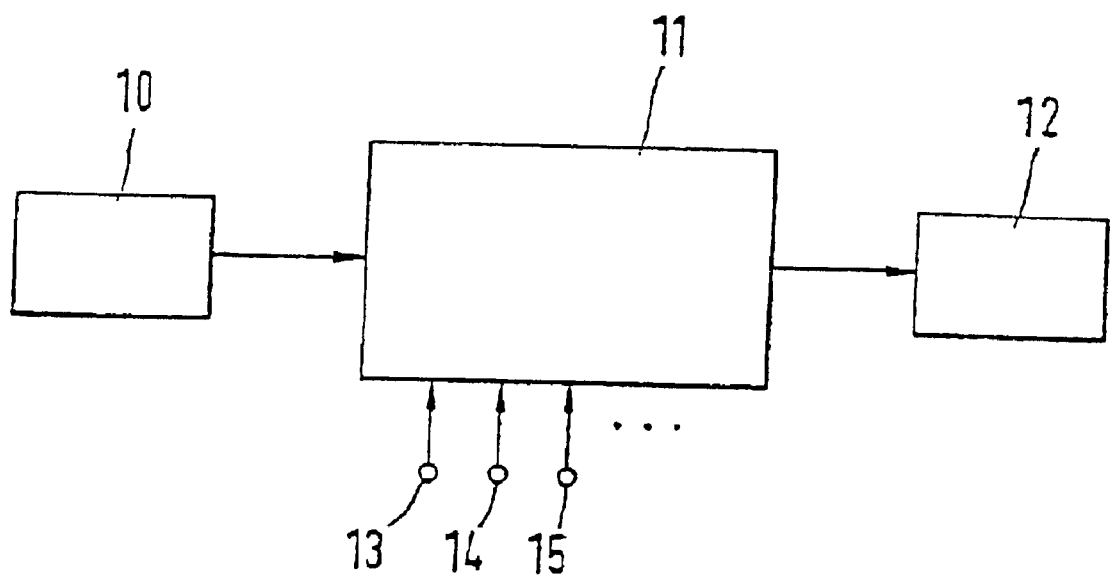
FIG. 1 shows an embodiment according to the present invention.

FIG. 1 shows a device for carrying out the method according to the present invention. A distance sensor 10, for example, a radar or a laser sensor, is connected to an evaluation and control unit 11. Evaluation and control unit 11 receives numerous further signals, of which, by way of example, an input 13 for the vehicle's own speed, an input 14 for a steering angle, and an input 15 for a yaw rate are depicted here. Furthermore, evaluation and control unit 11 is connected to one or a plurality of actuators 12. The entire device is installed in a first vehicle. Using distance sensor 10, in accordance with conventional methods, vehicles traveling ahead, oncoming vehicles, as well as stationary objects on, and on both sides of, the roadway are detected. Corresponding measuring data are pre-processed and are supplied to evaluation and control unit 11. The latter, in accordance with the method described below, determines at least one future travel-path area of the first vehicle. In the context of an adaptive speed regulation, evaluation and control unit 11, via actuator or actuators 12, controls or regulates the speed of the vehicle. Alternatively, or as a supplement, the unit, via actuators 12, controls, for example, the headlight range or the light cone of the headlights of the vehicle, or it generates a warning signal for a critical situation.

Figure 2:
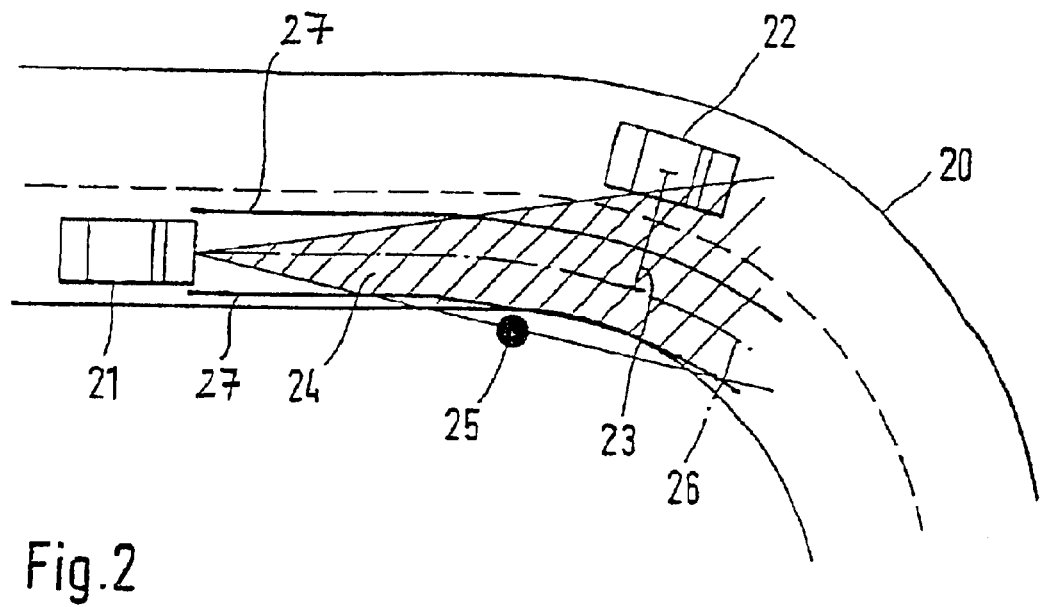
FIG. 2 shows a block diagram of an embodiment according to the present invention.

FIG. 2 shows a two-lane road 20, on which two vehicles 21 and 22 are moving in the same direction. Reference numeral 21 designates the vehicle which has the device according to the present invention. Extending from the front of vehicle 21, an angular area 24 is sketched, which symbolizes the detection range of distance sensor 10. A dot-dash line 26 depicts the future course path of vehicle 21. Two solid lines 27 designate the future travel-path area of vehicle 21. This future travel-path area results from future course path 26 of vehicle 21, enlarged by the vehicle width and any additional expansions. A distance 23 indicates a lateral transverse offset q between vehicles 21 and 22. Reference numeral 25 designates a stationary object, for example, a tree at the road edge.

Figure 3:
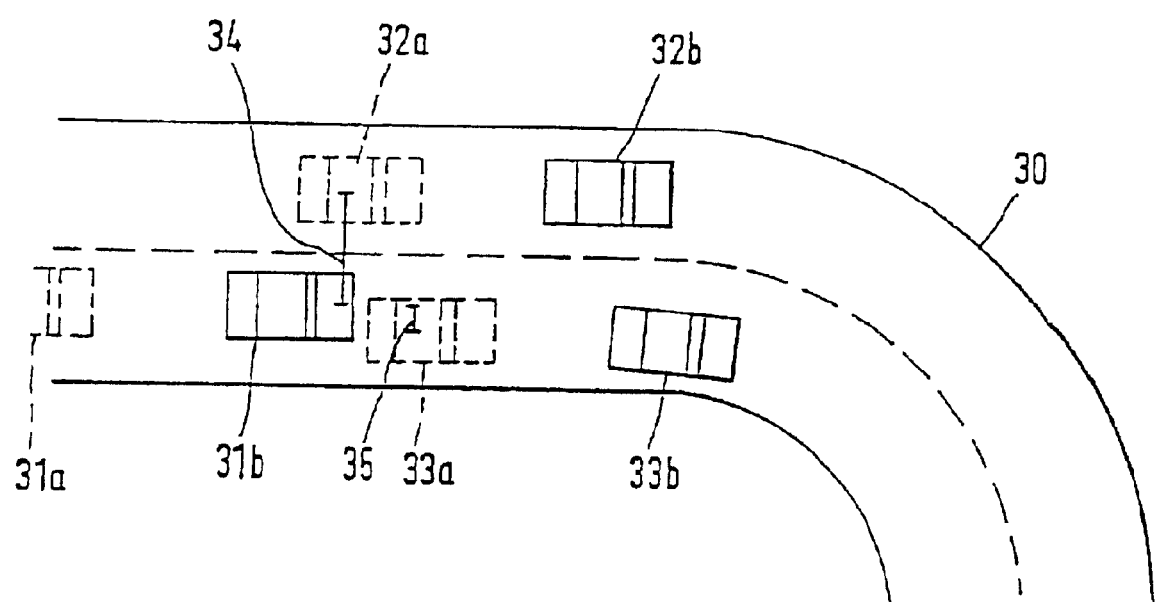
FIG. 3 shows a block diagram of an embodiment according to the present invention.

FIG. 3 also shows a two-lane road 30, on which three vehicles 31, 32, and 33, are represented at two different time points $t_0$ and $t_1$. The positions of the vehicles at time point to are represented in dotted lines and are designated as 31a, 32a, and 33a. The positions of the vehicles at time point $t_1$ are designated as 31b, 32b, and 33b. Two distances 34 and 35 designate in each case a transverse offset $q_1$ and $q_2$ between vehicles 31 and 32 and between vehicles 31 and 33 respectively.

Figure 4:
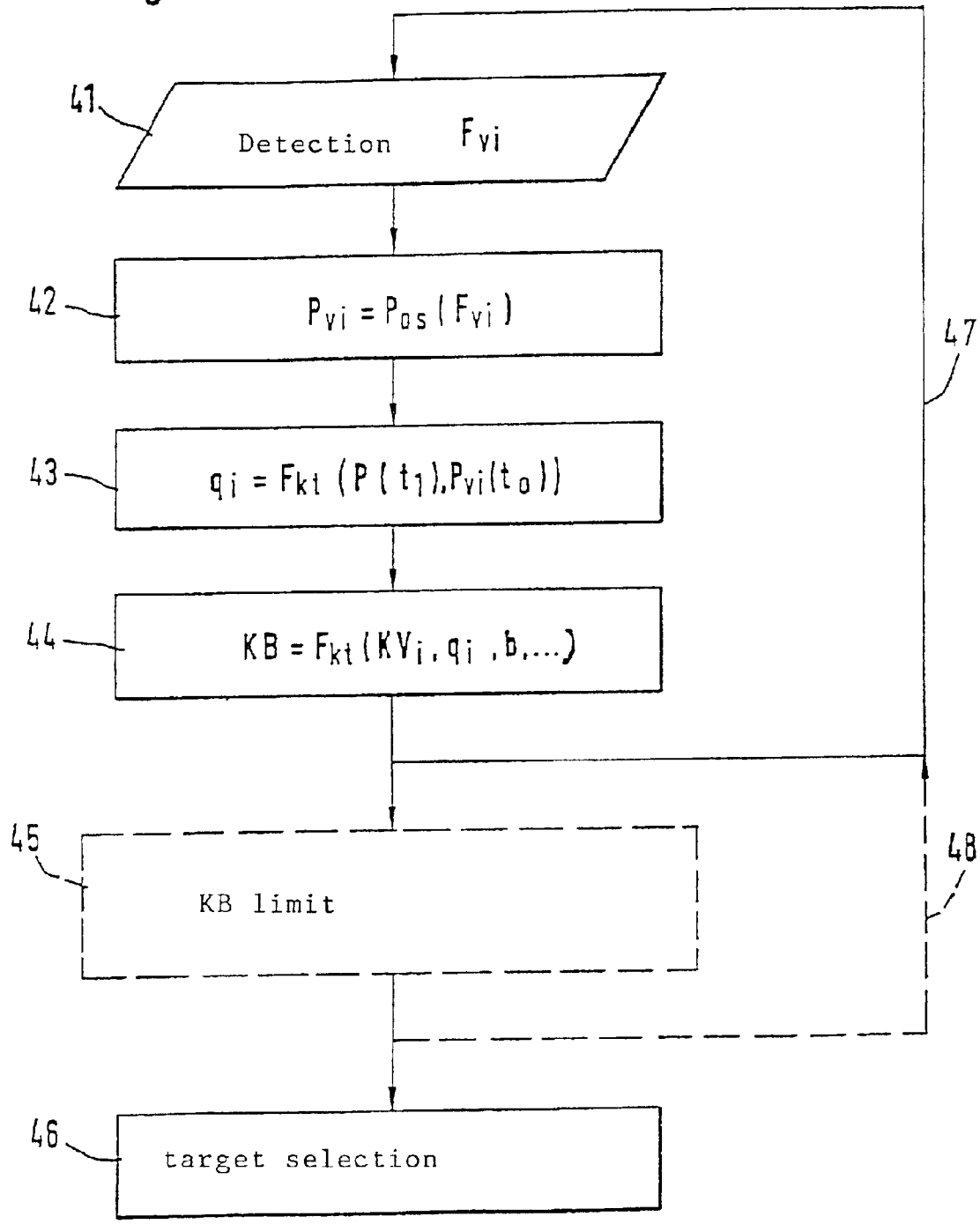
FIG. 4 shows a flowchart according to related art.

FIG. 4 depicts a flowchart in accordance with the related art. In step 41, using distance sensor 10, vehicles traveling ahead $F_{vi}$ are detected. In this context, according to FIG. 2 and FIG. 3, vehicles 22, 32, and 33, are detected. In step 42, a position $P_{vi}$ of each individual vehicle traveling ahead is determined. Depending on the specific configuration, this step can be carried out either by an evaluation circuit within distance sensor 10 or by evaluation and control unit 11. Determined positions $P_{vi}$ of vehicles traveling ahead $F_{vi}$ contain a distance $d_i$ and an angle $\alpha_i$. In step 43, a transverse offset $q_i$ is determined, which in FIGS. 2 and 3 is indicated by the distances 23, 34, and 35. In purely mathematical terms, transverse offset $q_i$ yields $$q_i = d_i * \sin\alpha_i.$$

However, because the curvature of road 20, and 30, and an additional transverse offset of vehicles $F_{vi}$, resulting therefrom, are not taken into account in this connection, specific transverse offset $q_i$ is determined on the basis of position P of vehicle 31 at time point $t_1$, and of position $P_{vi}$ of vehicles traveling ahead 32, 33 at time point $t_0$. In other words, transverse offset $q_i$ in this context is only determined if first vehicle 31 is located at or near the position which the specific vehicle traveling ahead occupied at one or more measuring time points previously.

In step 44, future travel-path area KB of controlled vehicle 21, 31 is determined on the basis of an assumed width b of the first vehicle, course path $KV_i$ of vehicles traveling ahead $F_{v2}$, the latter'S specific transverse offset $q_i$, and, if appropriate, previously determined course paths. In this context, the assumption is made that the first vehicle will continue to move as the vehicle traveling ahead or vehicles. When an intended or commencing lane change of the first vehicle is detected, for example, as a function of a blinker signal, the determined probable travel-path area is expanded in the corresponding direction. This distinguishes determined future travel-path area KB from a pure prediction of the road course. In step 47, the determination of future travel-path area KB of the first vehicle is carried out in an iterative manner, i.e., it is followed by a new determination cycle. In step 45, the determined future travel-path area is limited on the basis of stationary objects 25, and, if present, on the basis of detected oncoming vehicles $F_G$, which are not shown in FIGS. 2 and 3.

Subsequent step 46 relates to the application in the context of an adaptive speed and distance control system. Here, a vehicle traveling ahead is selected as the control target for the distance control system. In this context, only those vehicles traveling ahead are taken into account which are located within determined future travel-path area KB. If a plurality of vehicles traveling ahead are located in this area, then a selection is carried out concerning which of the vehicles traveling ahead requires the smallest desired acceleration, or the greatest desired deceleration, in the controlled vehicle. However, the selection, alternatively or as a supplement, can also be made as a function of other criteria. For example, the selection can be carried out in accordance with which of the vehicles traveling ahead has the least distance from the first, controlled vehicle. Reference numeral 48 designates the iterative repetition of the method.

Figure 5:
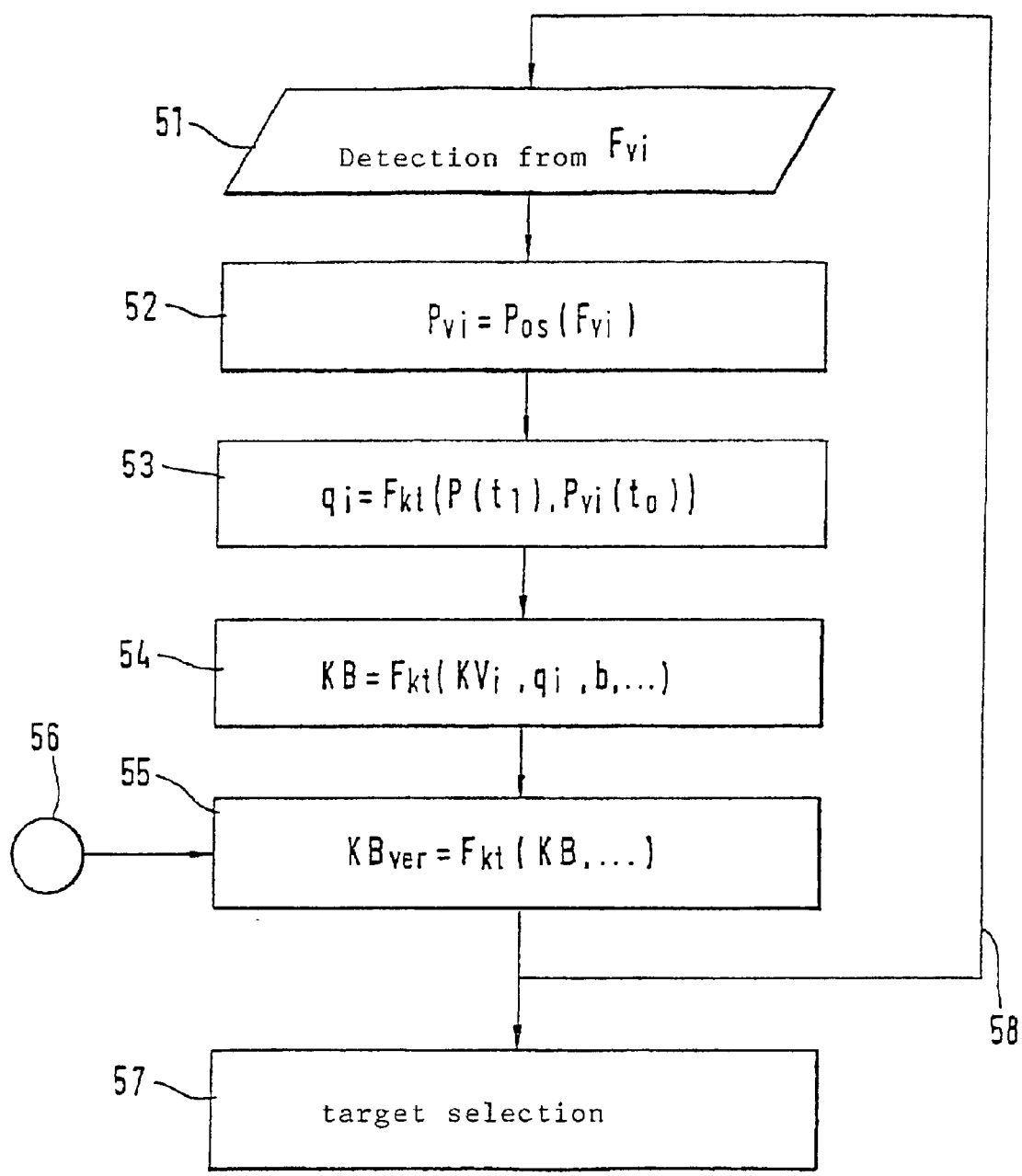
FIG. 5 shows a flowchart according to the related art.

FIG. 5 depicts a further flowchart in accordance with the related art. Steps 51 through 54, in this context, correspond to steps 41 through 44 according to the related art in FIG. 4. According to this second example, in step 55, a determination is made of the verified, future travel-path area KBver. For this purpose, in step 56, further measuring data are used, especially future travel-path area $KB_2$, determined elsewhere. This future travel-path area $KB_2$, which is determined elsewhere, can be determined, for example, on the basis of the methods known in the related art, using a yaw rate or a transverse acceleration. By linking a plurality of determined future travel-path areas that are independent of each other, the error rate present in a given system is further minimized. In the simplest case, linking two determined future travel-path areas KS and KB, is carried out as a result of the fact that first determined travel-path area KB is used as long as an preestablished minimum number of vehicles traveling ahead is detected. If fewer vehicles traveling ahead than this preestablished number are detected, then future travel-path area $KB_2$ is used. Alternatively, the data of both determined travel-path areas KB and $KB_2$ can also be correlated with each other, to obtain verified travel-path area KBver. In step 58, determining a future verified travel-path area also takes place in an iterative manner. Step 57 corresponds to step 46 from FIG. 4 and also contains a target selection of one vehicle traveling ahead in the context of an adaptive speed and distance regulation.

Figure 6:
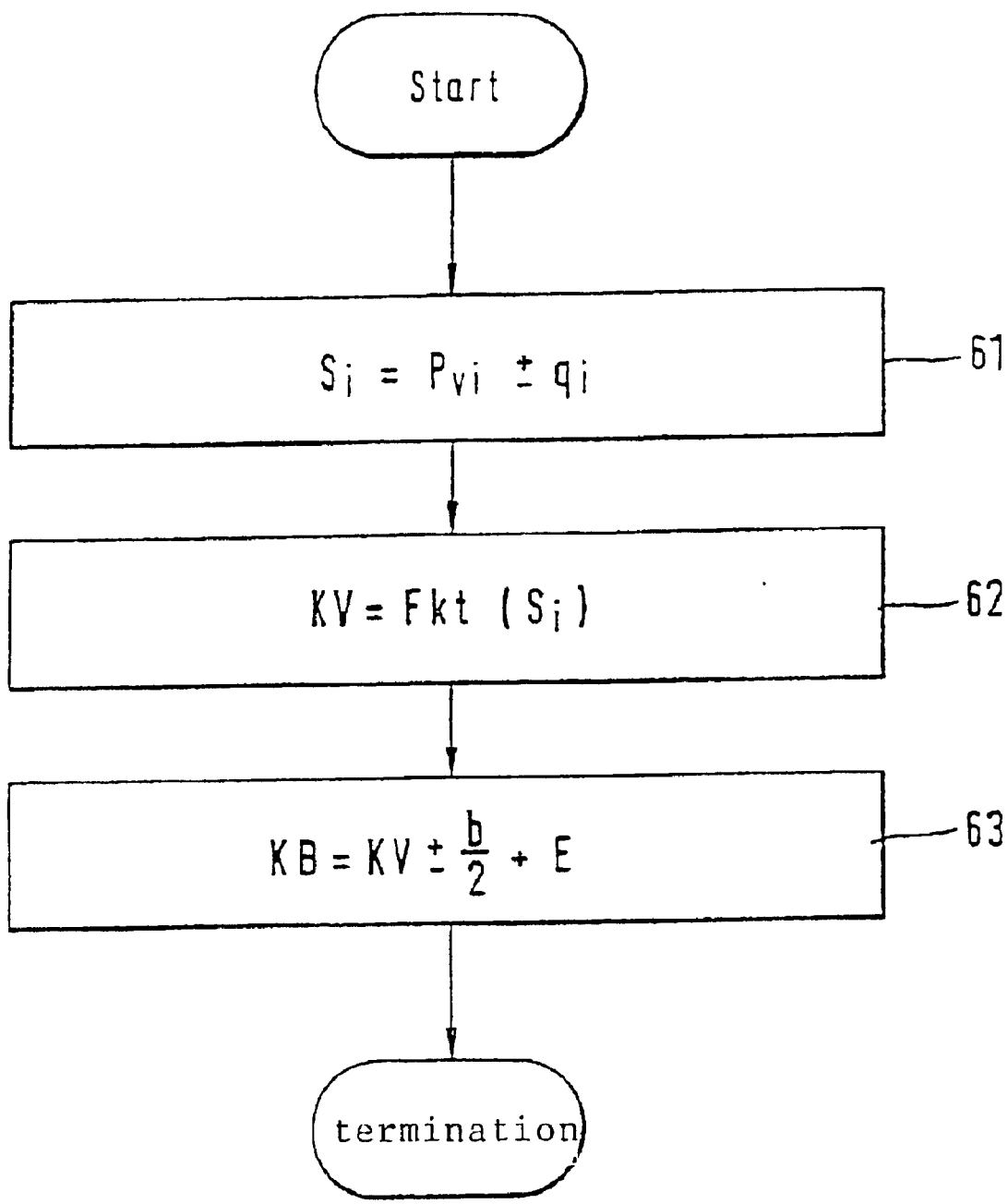
FIG. 6 shows a flowchart according to the related art.

FIG. 6 depicts a further flowchart according to the related art for a more detailed representation of the method steps for determining future travel-path area KB in steps 44 and 54 of FIGS. 4 and 5. Accordingly, steps 61 through 63 can be inserted in place of steps 44 and 54 in FIGS. 4 and 5. In step 61, points of reference $S_i$ are determined, in that positions $P_{vi}$ of detected vehicles traveling ahead $F_{vi}$ are set off against the relevant determined transverse offsets $q_i$. In the ideal case, all determined points of reference $S_i$ will lie on one curve, which corresponds to future course path KV of the first vehicle. In step 62, this course path KV is determined, in that a function is determined, for example, in the form of a polynomial, which at least approximately, to the extent possible, covers all points of reference $S_i$. This determined function then describes future course path KV. In step 63, future travel-path area KB is determined, in that course path KV is expanded by width b of the first vehicle. Additionally, if necessary, a further expansion E takes place as a function of the detected lane-change signals of the first vehicle.

Figure 7:
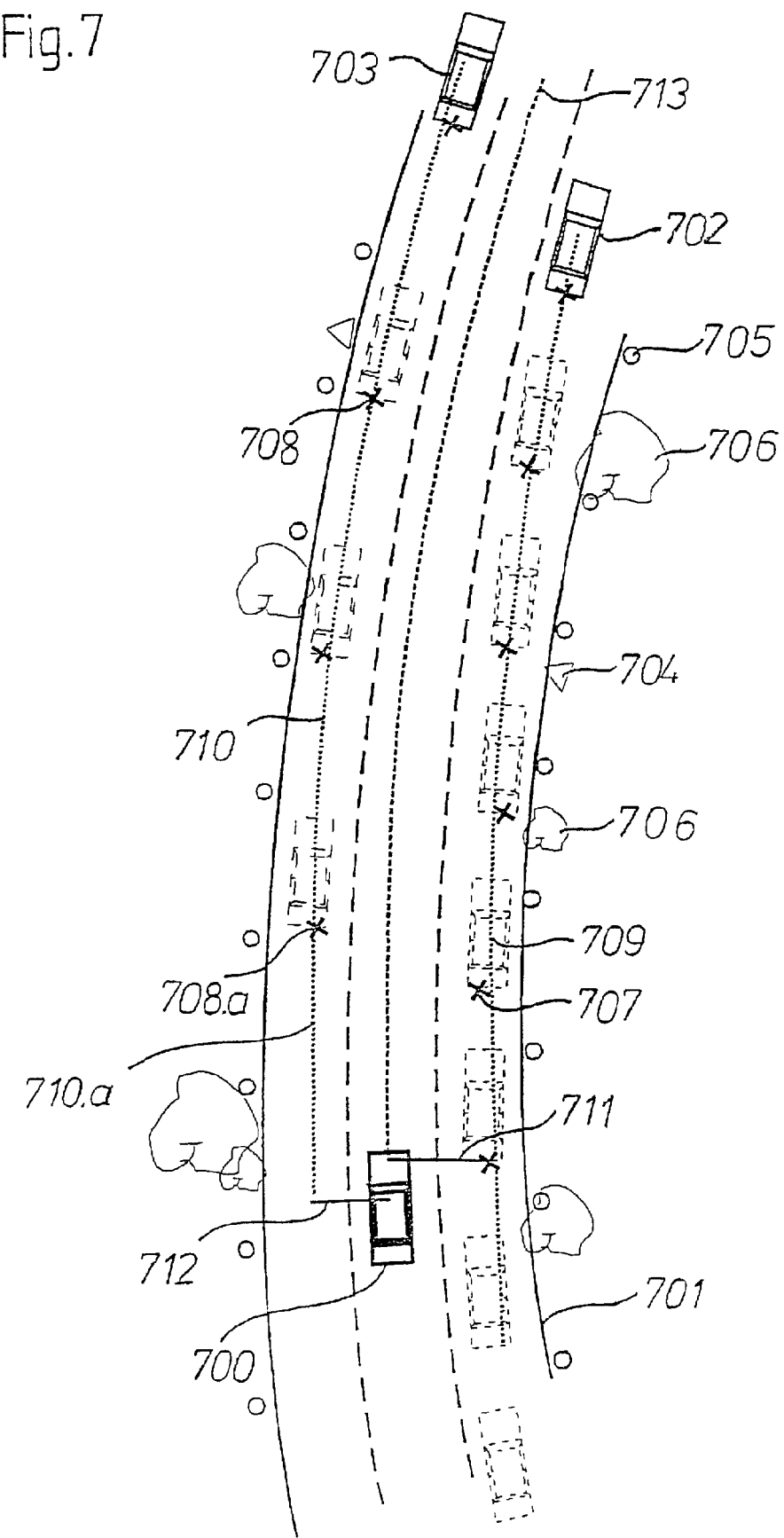
FIG. 7 shows a block diagram of an embodiment according to the present invention.

FIG. 7 depicts a schematic diagram of an embodiment of the present invention. In this context, reference numeral 700 designates the first vehicle, which is traveling on a multilane road 701. In the further course of road 701, two vehicles traveling ahead 702 and 703 are depicted. At the edge of road 701 are also located traffic signs 704, directional posts 705, and trees, which are designated as 706. First vehicle 700 is moving on the center lane of three-lane road 701. Vehicle traveling ahead 702 is moving on the right-hand lane relative to vehicle 700, whereas vehicle traveling ahead 703 is moving on the left-hand lane relative to first vehicle 700. First vehicle 700 is equipped with a distance sensor, which detects the positions of vehicles traveling ahead. The detected positions of vehicle traveling ahead 702 are depicted as crosses and are designated as 707. The detected positions of vehicle traveling ahead 703 are also depicted as crosses and are designated as 708. In the case of vehicle traveling ahead 702, the positions of vehicle 702 have already been detected by first vehicle 700, the positions being located at least at the same level as first vehicle 700 or even on the path already traveled. Using positions 707, detected in this manner and stored in a storage unit, a comparison curve can be determined which represents course path 709 of vehicle traveling ahead 702. Based on the course path of vehicle traveling ahead 702 and of the known position of first vehicle 700, the transverse offset 711 between first vehicle 700 and course path 709 of vehicle traveling ahead 702 can be determined. Assuming that vehicle traveling ahead 702 is the only vehicle traveling ahead, it would be possible to determine the future course path of first vehicle 700 on the basis of known course path 709 of vehicle traveling ahead 702 and of known transverse offset 711. This future course path of first vehicle 700, if only one reference vehicle 702 is forward, would move by transverse offset 711, shifted parallel to course path 709.

In the case of vehicle traveling ahead 703, no detected positions 708 are yet present, which are located at least at the same level as first vehicle 700. The first detected position of vehicle 703 is designated as 708.a and is situated still in front of the current position of first vehicle 700. On the basis of detected positions 708 of vehicle 703, by analogy to the procedure for vehicle 702, an offset line 710 can be determined, which represents the course path of vehicle traveling ahead 703. If course path 710 of vehicle 703 is projected, or interpolated, in the direction of first vehicle 700, the result is an extension of course path 710 by path 710.a, which extends up to the current position of first vehicle 700. Based on this projected course path 710.a of vehicle 703, it is possible to determine a transverse offset between the current position of first vehicle 700 and projected course path 710.a of vehicle 703. This transverse offset, designated as 712, with respect to vehicle 703 can therefore be determined, although first vehicle 700 has not yet reached the position of the first detection of vehicle 703, which is designated as 708.a. Therefore, from the point of view of first vehicle 700, two transverse offsets 711 and 712 with respect to vehicles traveling ahead 702 and 703 are known.

Furthermore, both course paths 709 and 710 of vehicles traveling ahead 702 and 703 are known. Using this known data, a future course path of first vehicle 700 on the basis of the two vehicles traveling ahead can now be determined. For this purpose, appropriately taking into account transverse offsets 711 and 712, the average value of course paths 709 and 710 is formed. The result is a determined future course path of first vehicle 700, which is designated in FIG. 7 as 713. This determined future course path 713, by analogy to the related art according to FIG. 6, is enlarged by the vehicle width as well as by any expansions. Course path 713 of first vehicle 700, expanded in this manner, represents the desired future travel-path area of first vehicle 700.

Alternatively, in place of determining the transverse offset between first vehicle 700 and course paths 709 and 710 of vehicles traveling ahead 702 and 703, a curvature between the current course path of first vehicle 700 and determined course paths 709 and 710 of vehicles traveling ahead 702 and 703 can be determined. On the basis of these known curvatures with respect to the course paths of the vehicles traveling ahead, a determination of a future course path of first vehicle 700 is also possible.

The determination of the future course path of first vehicle 700 is all the more precise, the greater the number of vehicles traveling ahead detected and their course paths determined. In this case, a verified future course path of first vehicle 700 through comparison, correlation, or an average of the projected course paths of all vehicles traveling ahead can be determined. In this context, projected course paths of vehicles traveling ahead can be filtered out, which, e.g., turn or, as a result of rapid lane change between the individual traffic lanes, do not yield any reliable course path or one that is suitable for the determination of the future travel-path area.

Analytically, the conversion of detected relative positional data 707 and 70B of vehicles traveling ahead 702 and 703 is accomplished using statistical analyses and/or using mathematical interpolation procedures. The result of this method is the projected course paths of the vehicles traveling ahead, which are stored in the storage device of the distance sensor of first vehicle 700. Within the storage device, which is organized preferably as a ring storage device, the stored projected course paths of the vehicles traveling ahead, at selected or freely selectable time points, are compared with the current coordinate system of the first vehicle. As a result of this conversion, the projected course paths of vehicles traveling ahead, at every time point, exist in the same coordinate system as the coordinate system of first vehicle 700. In order to assume the most relevant of the determined projected course paths of the vehicles traveling ahead in determining the future course path of first vehicle 700, the projected course paths of the vehicles traveling ahead are evaluated using a performance index, which contains statistical as well as nonpredictable and predictable components. On the basis of this performance index, in the case of values that lie below a predetermined threshold value, it can be decided whether a projected course path of a vehicle traveling ahead is determined as being irrelevant and therefore is deleted from the storage device, or whether, e.g., the relevance of this projected course path is only conditionally present, and the course path is not to be considered for determining the future travel-path area of the first vehicle. In the event that the storage device of the distance sensor of first vehicle 700 is full and detected relative positional data of further vehicles traveling ahead are present, then, in accordance with a further performance index, which in this case nevertheless only relies on predictable components, the decision is made whether the newly detected course path of a vehicle traveling ahead is so relevant that a previously stored projected course path of a vehicle traveling ahead should be deleted, or whether the newly detected relative positional data should be discarded. Using this method, it can be assured that, at every time point, the most relevant of the projected course paths of the vehicles traveling ahead are present in the storage device.

In the event that, on the basis of particular conditions or circumstances, the determined future travel-path area of first vehicle 700 extends beyond the area of road 701, then the future travel-path area is limited on the basis of stationary objects. This can be, e.g., as shown in FIG. 7, traffic signs 704, guide posts 705, or trees and/or bushes 706. Also possible is a limitation of the determined future travel-path area on the basis of the positions of detected oncoming vehicles.

If a further future travel-path area of first vehicle 700 is determined, then verification of the future travel-path area of first vehicle 700 is possible. This further future travel-path area of first vehicle 700 can be determined, for example, on the basis of a steering angle, a steering wheel angle, a yaw rate, a difference between wheel speeds, or a transverse acceleration of the first vehicle, or on the basis of stationary objects or oncoming vehicles. In this manner, the future course path, or the future travel-path area, of first vehicle 700 is verified using different methods which are fully independent of each other.

What is claimed is:

1. A method for determining a future travel-path area of a first vehicle, the first vehicle equipped with a distance sensor, comprising the steps of:

determining a relative position of at least one second vehicle traveling ahead of the first vehicle, the first vehicle determining the relative position of the at least one second vehicle at predetermined timepoints using the distance sensor;

storing the determined relative position of the at least one second vehicle in a storage device, the determined relative position constituting a course path of the at least one second vehicle traveling ahead;

determining the future travel-path area of the first vehicle at least as a function of the course path of the at least one second vehicle traveling ahead; and extrapolating the course path of the at least one second vehicle traveling ahead in direction of a position of the first vehicle.

2. The method according to claim 1, wherein the step of extrapolating the course path of the at least one second vehicle includes extrapolating the course path of the at least one second vehicle to a position in which the first vehicle is located occurs up to the position of the first vehicle.

3. The method according to claim 1, further comprising the step of:
determining at least one of a transverse offset and a curvature between the extrapolated course path of the at least one second vehicle traveling ahead and a current course path of the first vehicle.

4. The method according to claim 3, further comprising the step of:
determining the future travel-path area of the first vehicle using at least one of a transverse offset and a curvature of the current course path of the first vehicle in relation to the extrapolated course path of the at least one second vehicle traveling ahead.

5. The method according to claim 4, wherein the determining of the future travel-path area is based on a plurality of projected course paths of the at least one second vehicle traveling ahead, and further comprising:
filtering out a lane change of one of the at least one second vehicle traveling ahead using one of a comparison, a correlation, and an average of the plurality of extrapolated course paths of all of the at least one second vehicle traveling ahead.

6. The method according to claim 1, further comprising:
comparing the course path of the at least one second vehicle traveling ahead stored with at least one coordinate of the current course path of the first vehicle at at least one of selected timepoints and freely selectable timepoints.

7. The method according to claim 1, wherein the step of extrapolating the course path of the at least one second vehicle traveling ahead is accomplished using at least one of statistical analyses and mathematical interpolation procedures on the determined relative position stored.

8. The method according to claim 1, further comprising:
evaluating the extrapolated course path of the at least one second vehicle traveling ahead using at least one performance criterion, wherein the at least one performance criterion contains a statistical component, a nonpredictable component and a predictable component.

9. The method according to claim 8, further comprising:
when the at least one performance criterion of the extrapolated course path of the at least one second vehicle traveling ahead is less than a predetermined threshold performance value, then at least one of: (i) deleting the extrapolated course path of the at least one second vehicle traveling ahead from the storage device and (ii) not considering the extrapolated course path of the at least one second vehicle traveling ahead in the determining of the future travel-path area of the first vehicle.

10. The method according to claim 1, wherein the storage device is configured as a ring storage device.

11. The method according to claim 1, further comprising:
when the storage device is fall, determining whether to delete at least one of the course path stored; and any-new course paths, in accordance with a performance criterion based on at least one predictable component.

12. The method according to claim 1, further comprising:
limiting the future travel-path area based on at least one of a position of detected stationary objects and a position of detected oncoming vehicles.

13. The method according to claim 1, further comprising:
determining at least one further future travel-path area of the first vehicle based on at least one of a steering angle, a steering wheel angle, a yaw rate, a difference of wheel speed, a transverse acceleration of the first vehicle, a stationary object detected by the distance sensor of the first vehicle, and an oncoming vehicle detected by the distance sensor of the first vehicle; and
determining a verified future travel-path area based on the future travel-path area and the at least one further future travel-path area.

14. The method according to claim 1, wherein the extrapolated course path of the at least one second vehicle is substantially parallel to a current path of the first vehicle.

15. The method according to claim 1, wherein a current path of the first vehicle is within a first lane of a road and the extrapolated course path of the at least one second vehicle is contained in a second lane of the road.

16. A device for determining a future travel-path area of a first vehicle, the first vehicle having a current course path, comprising:
a distance sensor associated with the first vehicle to determine at predetermined time points at least a relative position of at least one vehicle traveling ahead in relation to the first vehicle;
at least one storage device configured to store the relative position determined;
an arrangement configured to determine a travel-path of the at least one vehicle traveling ahead from the at least the relative position stored in the storage device;
an arrangement configured to determine the future travel-path area of the first vehicle at least based on the travel-path of the at least one vehicle traveling ahead; and
an arrangement configured to extrapolate the travel-path of the at least one vehicle traveling ahead in direction of the current course path of the first vehicle.

* * * * *